(12) United States Patent
Korobeynikov et al.

(10) Patent No.: US 11,423,943 B2
(45) Date of Patent: Aug. 23, 2022

(54) METHOD AND APPARATUS FOR GENERATING A VIDEO BASED ON A PROCESS

(71) Applicant: UiPath, Inc., New York, NY (US)

(72) Inventors: Denys Korobeynikov, Vinnytsia (UA); Oleksandr Reminnyi, Vinnytsia (UA); Mykola Zubekhin, Lviv (UA); Kateryna Matusova, Khmelnytskyi (UA)

(73) Assignee: UiPath, Inc., New York, NY (US)

( * ) Notice: Subject to any disclaimer, the term of this patent is extended or adjusted under 35 U.S.C. 154(b) by 0 days.

(21) Appl. No.: 17/209,148

(22) Filed: Mar. 22, 2021

(65) Prior Publication Data

US 2022/0051696 A1 Feb. 17, 2022

Related U.S. Application Data

(63) Continuation of application No. 16/992,153, filed on Aug. 13, 2020, now Pat. No. 10,998,004.

(51) Int. Cl.
*G11B 27/031* (2006.01)
*G11B 27/34* (2006.01)

(52) U.S. Cl.
CPC ............ *G11B 27/031* (2013.01); *G11B 27/34* (2013.01)

(58) Field of Classification Search
CPC ............................ G11B 27/031; G11B 27/34
See application file for complete search history.

(56) References Cited

U.S. PATENT DOCUMENTS

| | | |
|---|---|---|
| 2013/0132833 A1 | 5/2013 | White et al. |
| 2017/0353406 A1 | 12/2017 | Ramamurthy et al. |
| 2018/0060222 A1 | 3/2018 | Kogan et al. |
| 2020/0050983 A1 | 2/2020 | Balasubramanian et al. |
| 2020/0313916 A1 | 10/2020 | Janakiraman et al. |

OTHER PUBLICATIONS

Snagit Tutorials, "Create Video from Images to Demonstrate or Share Information," retrieved from https://www.techsmith.com/tutorial-snagit-video-from-images.html, Mar. 31, 2020, 6 pgs.

*Primary Examiner* — Mishawn N. Hunter
(74) *Attorney, Agent, or Firm* — Chiesa Shahinian & Giantomasi PC

(57) ABSTRACT

A method and apparatus for generating a video using a process diagram and using a process documentation guide storing screenshots and user inputs associates each node of a process diagram with a respective screenshot stored in the process documentation guide. A video is generated displaying each respective screenshot associated with each node of the process diagram in a sequence identified by the process diagram. The process diagram is generated by a user or by the process video server based on information in the process documentation guide.

11 Claims, 7 Drawing Sheets

METHOD AND APPARATUS FOR GENERATING A VIDEO BASED ON A PROCESS

CROSS-REFERENCE TO RELATED APPLICATIONS

This application is a Continuation of prior-filed U.S. patent application Ser. No. 16/992,153, filed Aug. 13, 2020, the disclosure of which is incorporated herein by reference in its entirety.

FIELD OF THE INVENTION

The present disclosure relates generally to task mining and more particularly to generating a video based on a process performed by a user.

BACKGROUND

A process performed by a user on a computer may need to be taught to a coworker so that the coworker can perform that process as well. Although the user can teach the coworker how to perform the process via in person instruction, this is often not convenient or practical. Although it is possible to record the user's input to a computer while the user is performing the process, the coworker typically cannot easily learn the process by reviewing the recorded information. An instructional video can be manually created based on the recording of the user's input to the computer. However, manual creation of an instructional video is time consuming and prone to error. Further, recording a single instance of the user performing the process will be insufficient for a process in which the user must make decisions that affect how the process proceeds. For example, if the user must decide between two or more options during a particular step of the process, more than one recording of the user performing the process will be needed in order to capture both options. The number of required recordings grows with an increasing number of options within the process.

SUMMARY

A method and apparatus for generating a video using a process diagram and using a process documentation guide storing screenshots and user inputs associates each node of a process diagram with a respective screenshot stored in the process documentation guide. A video is generated displaying each respective screenshot associated with each node of the process diagram in a sequence identified by the process diagram. The process diagram is generated by a user or by the process video server based on information in the process documentation guide. The process documentation guide comprises a record of user input and screenshots of a user performing a process. In one embodiment, the associating each user action identified in the process documentation guide with a node of the process diagram begins with reading (also referred to as analyzing) the process diagram from start to end. Each node of the process diagram is marked as read by selecting a first node downstream of a decision node, wherein the first node is associated with information having a timestamp earlier than other nodes downstream of the decision node. Next, the first branch read is designated as the main branch. Then, for each unread node, the unread node is read from itself to the closes upstream node that has already been read. The number of nodes of each branch is determined and each branch is identified based on the number of nodes in each branch.

DETAILED DESCRIPTION

A method for converting process documentation into a video uses a process documentation guide and a process diagram. Information stored in the process documentation guide is generated using a capture tool. The capture tool captures screenshots and user input as a user performs activities associated with a process. The process diagram, in one embodiment, is generated based on information from the process documentation guide.

FIGS. 1-4 each show a series of actions that pertain to a process that is performed by a user. The series of actions shown in each of FIGS. 1-4 are performed by a user at a computer. Each of the series of actions shown in FIGS. 1-4 is a different path through a single process. The series of actions shown in each of FIGS. 1-4 show an iteration of the process in which some actions are similar to actions performed in other iterations and some actions are different from actions performed in other iterations. The path through the process depends on business rules that the user applies in order to determine which one of a plurality of actions should be performed. In one embodiment, a particular action that is performed by the user is based solely on a business rule. In another embodiment, a particular action is performed based on a business rule and information obtained by the user in a prior action. For example, the prior action could pertain to obtaining information required to make a decision according to a business rule.

Figure 1:
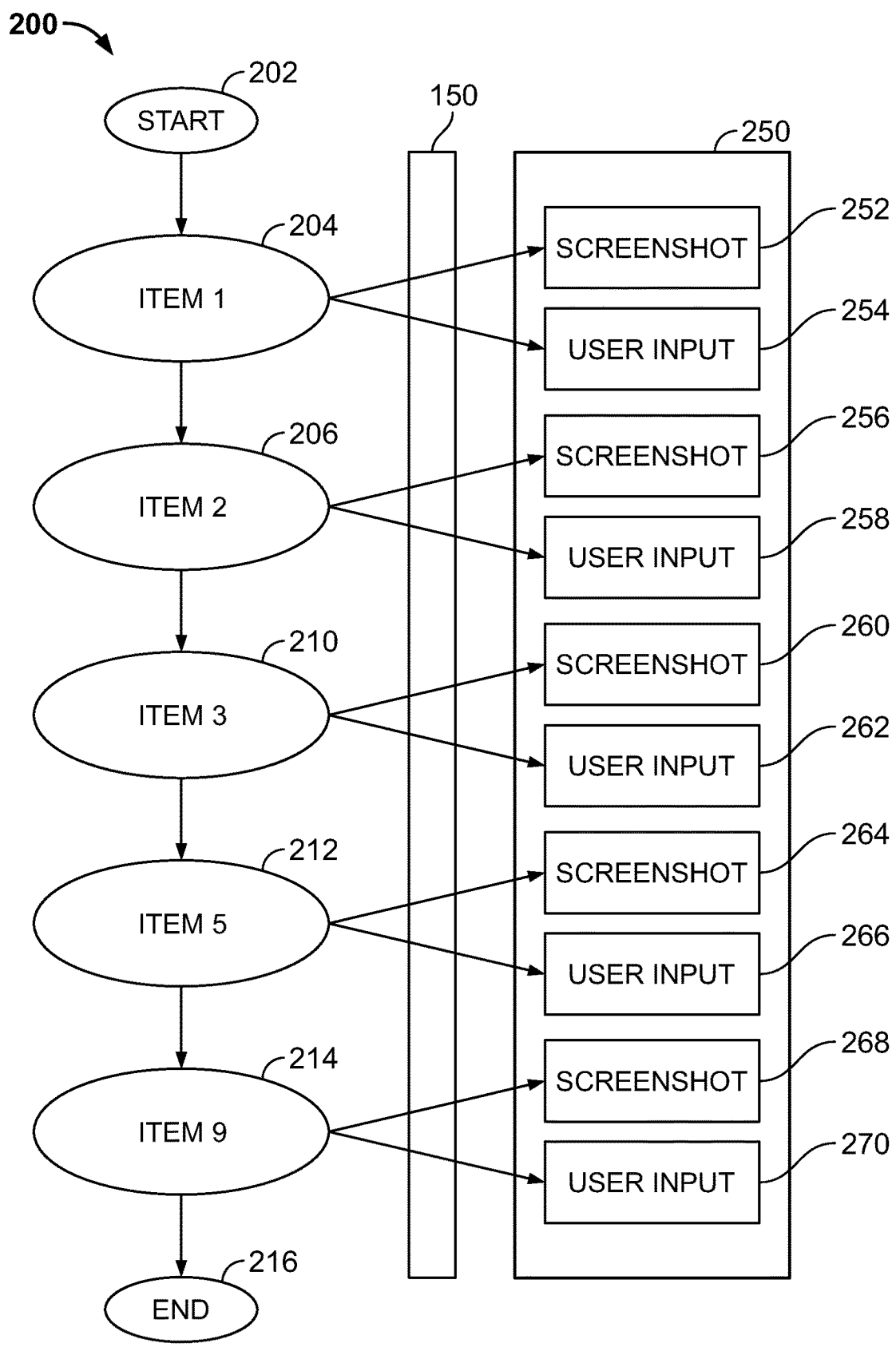
FIG. 1 shows a first series of actions associated with a process.

FIG. 1 depicts a series of actions 200 performed by a user on a computer beginning at Start node 202 and proceeding to Item 1 action 204. Item 1 may be any action the user performs on the computer such as opening a file or program, selecting data, drafting an email, etc. The series of actions shown in FIG. 1 proceeds from Item 1 action 204 to Item 2 action 206 which is another action performed by the user. The series of actions continues to Item 3 action 210, which is an action the user performs in response to a decision made by the user in view of a business rule (not shown). Series of actions 200 then proceeds to Item 5 action 212, and then to Item 9 action 214 each of which are actions performed by the user in the sequence shown in FIG. 1. The series of actions shown in FIG. 1 stops at End 216.

Each action of series of actions 200 (i.e., action 204 through action 214) are monitored by capture tool 150 which is installed and executed on the computer that the user is using to perform the series of actions. Capture tool 150 captures screenshots of information that is displayed to the user. Capture tool 150 also captures user input entered via a keyboard, cursor control (e.g., mouse) or any other user input device. The capture tool stores the screenshots and entered user input in process documentation guide 250. In one embodiment, process documentation guide 250 is a database storing screenshots and user input related to actions performed during one or more processes.

When a user is performing the series of actions shown in FIG. 1, the user knows and adheres to certain business rules which are not shown in the series of actions of FIG. 1. As described above, the business rules affect which of a plurality of actions are performed. A business rule can also be considered in connection with information obtained by performance of a prior action.

In one embodiment shown in FIG. 1, capture tool 150 captures user input and a screen shot associated with each action and stores them in process documentation guide 250. As shown in FIG. 1, screenshot 252 and user input 254 are stored in process documentation guide 250 after having been captured by capture tool 150 during performance of Item 1 action 204 by the user. Similarly, screenshot 256 and user input 258 were captured during performance of Item 2 action 206, screenshot 260 and user input 262 were captured during performance of Item 3 action 210, screenshot 264 and user input 266 were captured during performance of Item 5 action 212, and screenshot 268 and user input 270 were captured during performance of Item 9 action 214.

Process documentation guide 250, in one embodiment, is a database storing screenshots and user inputs associated with actions. Each screenshot and user input are stored associated with an identifier indicating the action that was performed when the screenshot and user input were captured. Although similar actions may be performed during different series of actions (e.g. each series of actions shown in FIGS. 1-4), each action has its own screenshot and user input associated with it that were captured at the time the action was performed.

Figure 2:
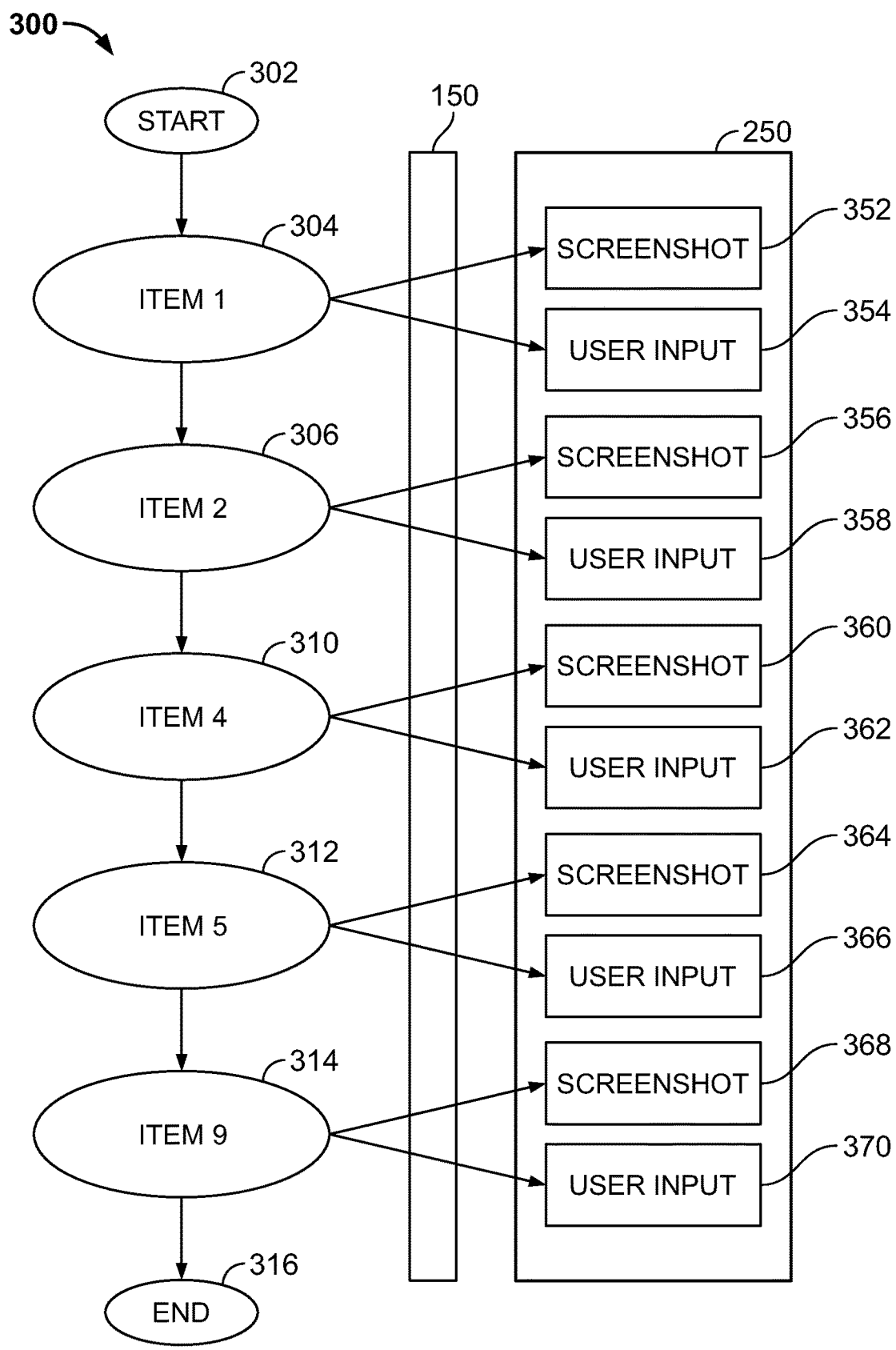
FIG. 2 shows a second series of actions associated with the process.
Figure 3:
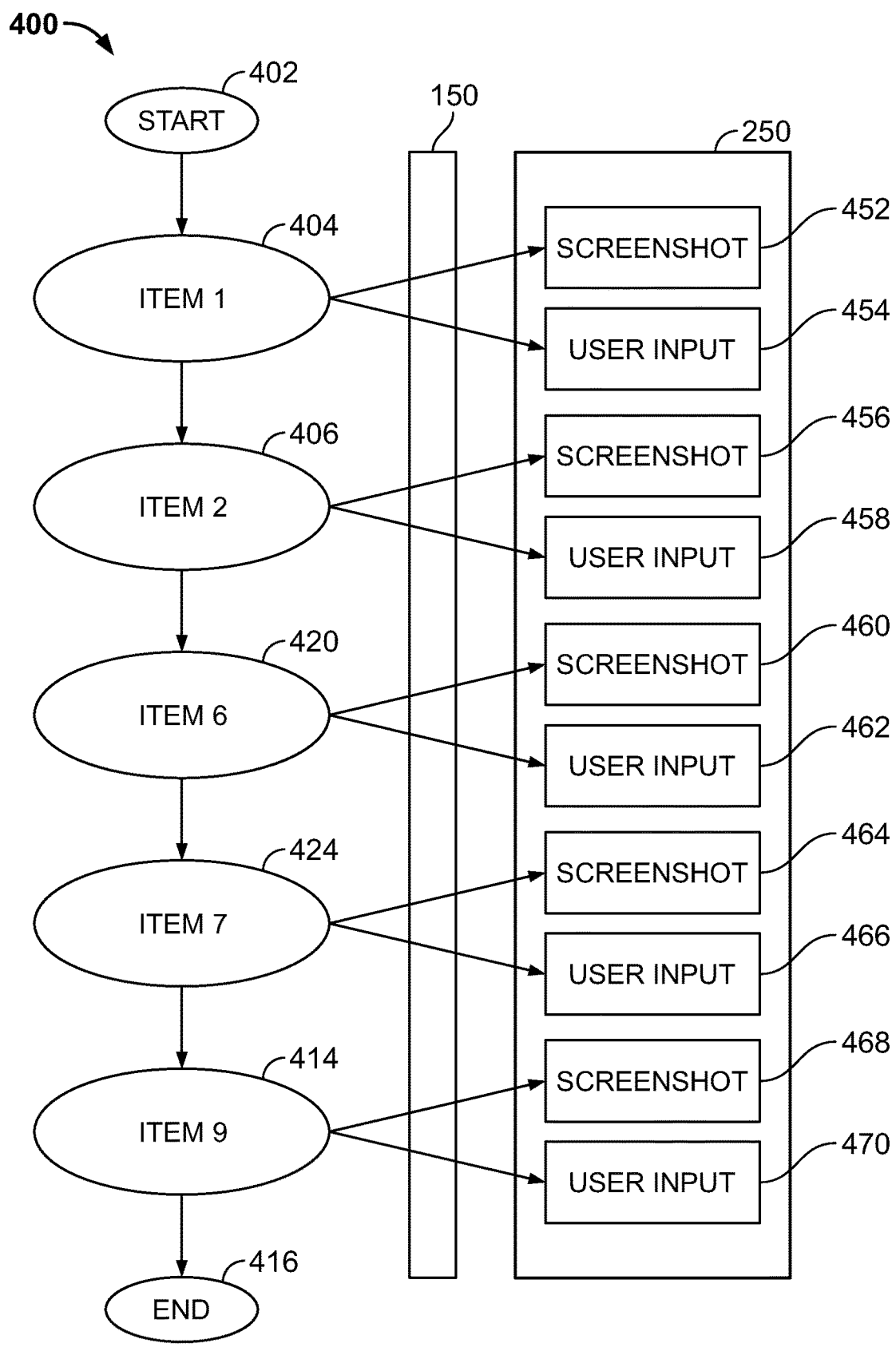
FIG. 3 shows a third series of actions associated with the process.
Figure 4:
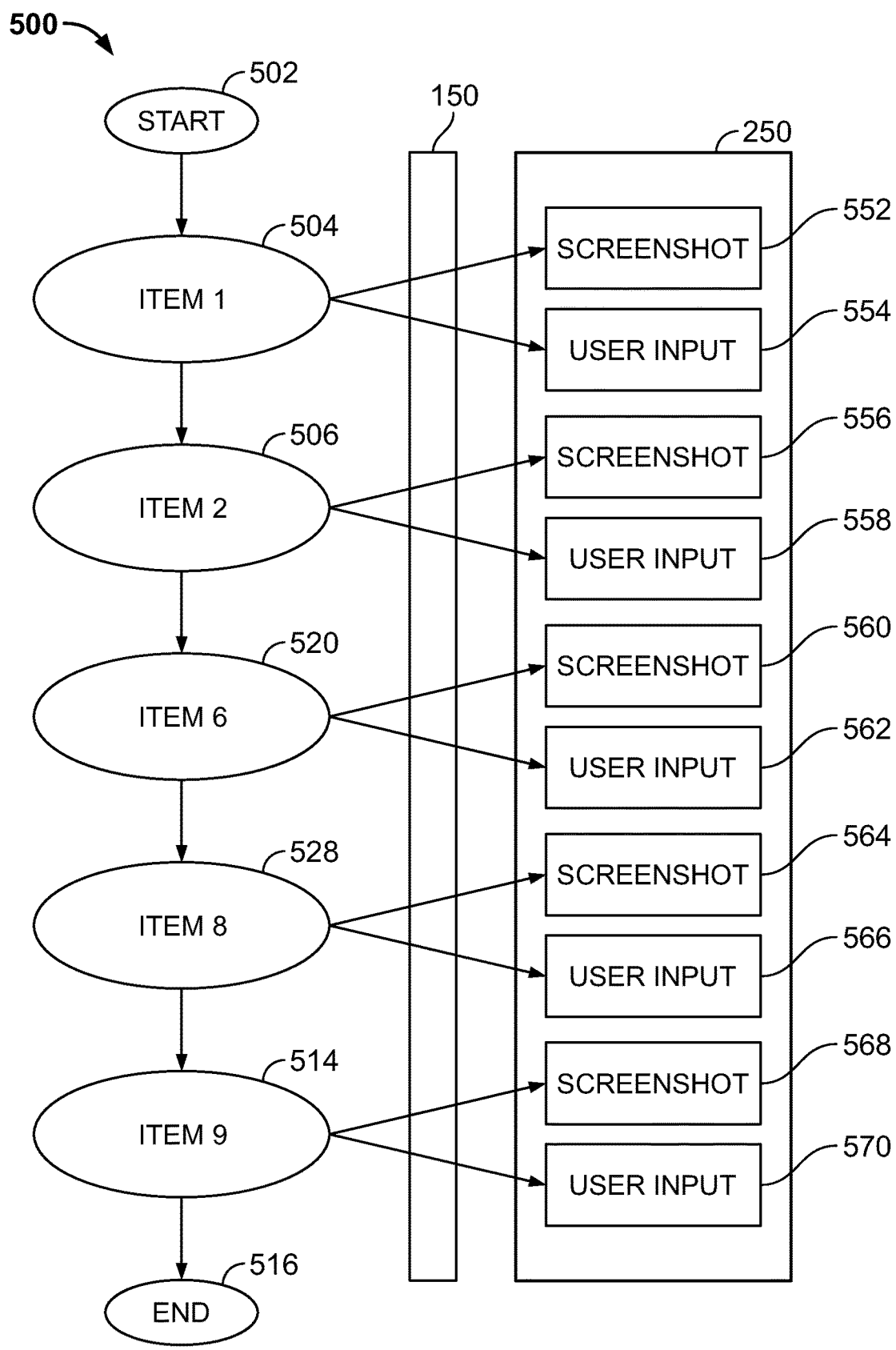
FIG. 4 shows a fourth series of actions associated with the process.

FIGS. 2-4, similar to FIG. 1, show a series of actions performed by a user and screenshots and user inputs that are captured by capture tool 150 and stored in process documentation guide 250.

FIG. 2 shows series of actions 300 performed by the user. FIG. 2 differs from FIG. 1 in that a business decision (describe in further detail below in connection with FIG. 5) causes the user to perform Item 4 action 310 after Item 2 action 306. Series of actions 300 begins at start 302, proceeds through actions 304, 306, 310, 312, and 314, and stops at end 316. Screenshots 352, 356, 360, 364, and 368 and user inputs 354, 358, 362, 366, and 370 are captured by capture tool 150 and stored in process documentation guide 250.

FIG. 3 shows series of actions 400 performed by the user. FIG. 3 differs from FIGS. 1 and 2 in that a business decision causes the user to perform Item 6 action 420 after Item 2 action 406. Series of actions 400 begins at start 402, proceeds through actions 404, 406, 420, 424, and 414, and stops at end 416. Screenshots 452, 456, 460, 464, and 468 and user inputs 454, 458, 462, 466, and 470 are captured by capture tool 150 and stored in process documentation guide 250.

FIG. 4 shows series of actions 500 performed by the user. FIG. 4 differs from FIG. 3 in that a business decision causes the user to perform Item 8 action 528 after Item 6 action 520. Series of actions 500 begins at start 502, proceeds through actions 504, 506, 520, 528, and 514, and stops at end 516. Screenshots 552, 556, 560, 564, and 568 and user inputs 554, 558, 562, 566, and 570 are captured by capture tool 150 and stored in process documentation guide 250.

The screenshots and user actions shown in FIGS. 1-4 are stored in process document guide 250 and are associated with the action that was performed when the respective screenshot and user action were captured. Although some of the actions performed in each of the series of actions shown in FIGS. 1-4 are similar actions (i.e., actions 204, 304, 404, and 504), each action that is performed by a user is unique. For example, each of the actions 204, 304, 404 and 504 named "Item 1" shown in FIGS. 1-4 are performed in each of series of actions 200, 300, 400, and 500, respectively, as shown in FIGS. 1-4.

In one embodiment, the data stored in process document guide 250 can be used to generate a process diagram of the process. Process documentation guide 250 is shown in FIGS. 1-4 as storing screenshots and user input information associated with the process performed by the user associated with each of series of actions 200, 300, 400, and 500.

Figure 5:
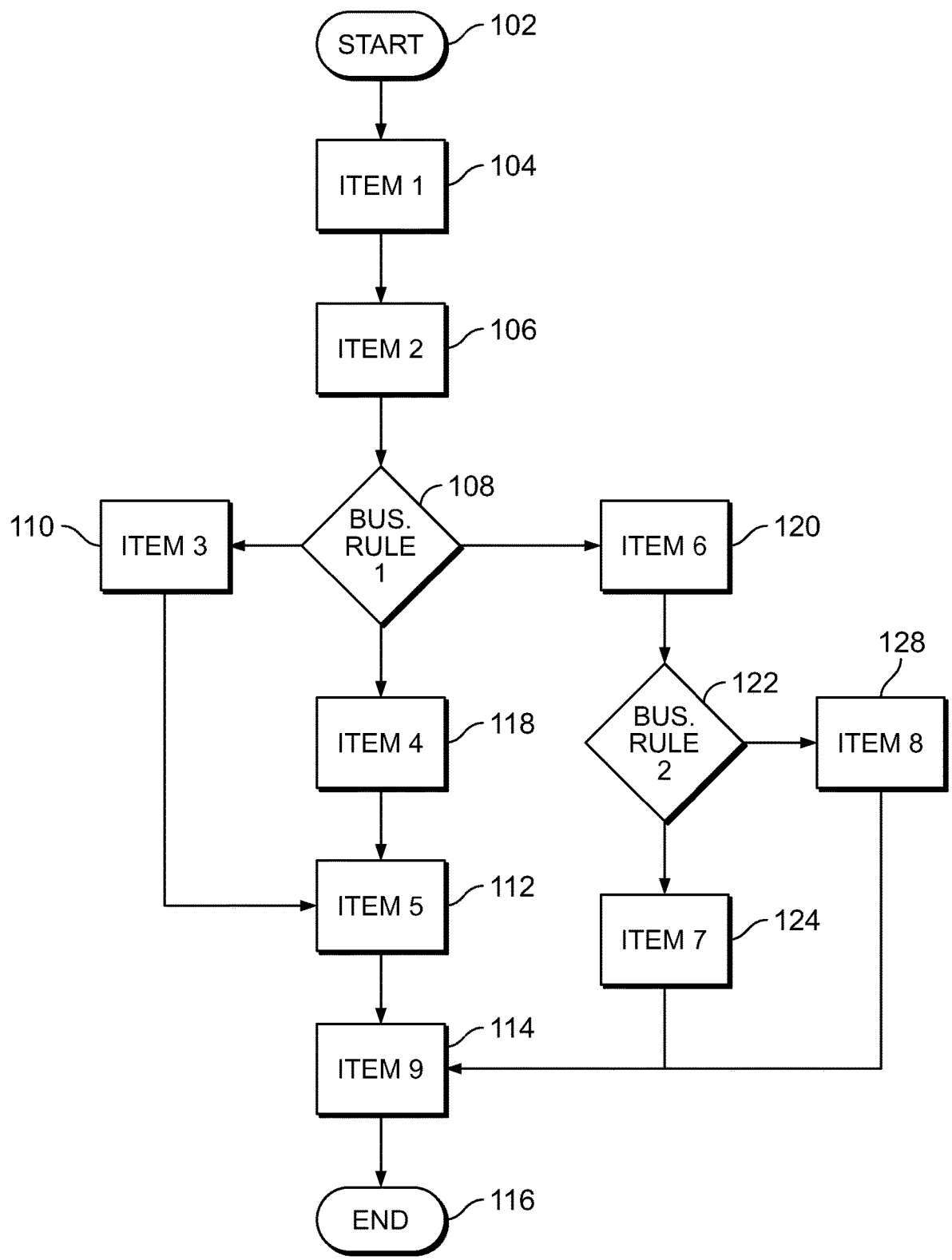
FIG. 5 shows a process diagram according to an embodiment.

FIG. 5 shows process diagram 100, which is a flow chart illustrating the process that is performed by one or more users as shown in FIGS. 1-4. Process diagram 100 shown in FIG. 5 is a combination of all of the paths through a process as shown in FIGS. 1-4 in a single flow chart. Actions that are similar, such as actions 204, 304, 404, and 504 (named "Item 1") are consolidated into a single node of process diagram 100, in this case node 104 (named "Item 1").

Process diagram 100 begins at Start node 102 and proceeds to Item 1 node 104. Node 104 represents an action performed by a user, specifically, Item 1 shown in FIGS. 1-4. Item 1 is an action that is performed in FIG. 1 action 204, FIG. 2 action 304, FIG. 3 action 404, and FIG. 4 action 504. Similarly, Item 2 node 106 represents another action is performed by the user. At Bus. Rule 1 node 108 a decision is made that determines which of three nodes the process of process diagram 100 will proceed to next. In one embodiment, the rule is known by a user and is used to determine which of three nodes the process will proceed to after node 106. Each path though process diagram 100 represents one of the series of actions shown in FIGS. 1-4.

A first path is associated with the series of actions shown in FIG. 1. The first path begins at Start node 102 and proceeds to Item 1 node 104, then Item 2 node 106, and then Bus. Rule 1 node 108. The first path then proceeds from node 108 to Item 3 node 110. From node 110 the first path proceeds to Item 5 node 112 and then to Item 9 node 114. After node 114, the first path stops at End node 116.

A second path is associated with a series of actions shown in FIG. 2. Returning to Bus. Rule 1 node 108 where a decision is made that determines which of three nodes the process of process diagram 100 will proceed to next, the second path proceeds from node 108 to Item 4 node 118. The second path then proceeds to Item 5 node 112 and then to Item 9 node 114. After node 114, the second path stops at End node 116.

A third path is associated with a series of actions shown in FIG. 3. Returning to Bus. Rule 1 node 108 where a decision is made that determines which of three nodes the process of process diagram 100 will proceed to next, the third path proceeds from node 108 to Item 6 node 120. The third path proceeds to Bus. Rule 2 node 122. The third path proceeds from node 122 to Item 7 node 124, and then proceeds to Item 9, node 114. After node 114, the third path stops at End node 116.

A fourth path is associated with a series of actions shown in FIG. 4. Returning to Bus. Rule 2 node 122, the fourth path proceeds from node 122 to Item 8 node 128. From node 128, the fourth path proceeds to Item 9 node 114. After node 114, the third path stops at End node 116.

In one embodiment, process diagram 100 is generated by a user reviewing process documentation, such as screenshots and user input related to the process that are stored in the process documentation guide 250. Process diagram 100 can also be automatically generated by a process video server.

In one embodiment, each node of process diagram 100 represents a series of cations that consist of screenshots and notes. In one embodiment, each business rule node can be converted into a heading elements which is displayed as a text frame in an generated video. Also, since video is a one-direction stream of information and process diagram 100 is not, process diagram 100 must be converted to a flat stream (e.g., a one-direction stream of information). After process diagram 100 is flattened, each node of process diagram 100 can be resolved to its representation (i.e., sequences to actions set, business rules to headings, etc.) in order to generate a video.

Figure 6:
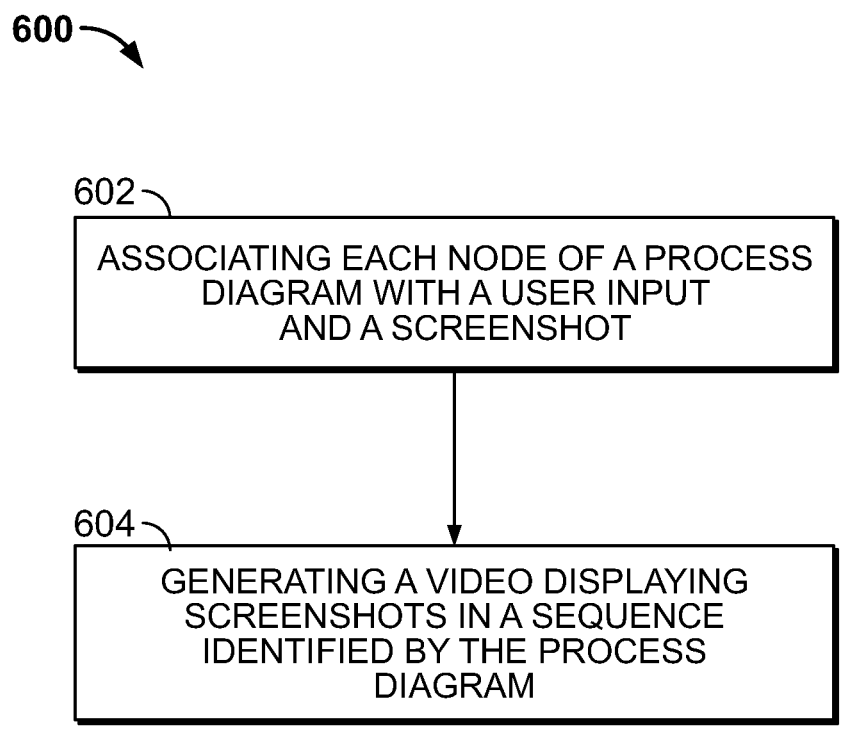
FIG. 6 shows a method for generating a video according to an embodiment.

FIG. 6 shows a flow chart of a method 600 for generating a video based on a process diagram (e.g., process diagram 100 shown in FIG. 5) and information in a process documentation guide (e.g., process documentation guide 250 shown in FIGS. 1-4). In one embodiment, method 600 is performed by a process video server which stores a process diagram and a process documentation guide associated with a particular process (e.g., the process shown in FIG. 1). At step 602, each node of a process diagram is associated with a user input and a screenshot. At step 604, a video is generated displaying screenshots in a sequence identified by the process diagram.

In one embodiment, a process video server performs step 602 of method 600 in which each node of a process diagram is associated with a user input and a screenshot. First, the nodes shown in the process diagram (e.g., process diagram 100 shown in FIG. 1) are read (also referred to as analyzed) by the process video server from start to end and each node is marked as read as described as follows. After a decision node is read, the first node downstream of the decision node is selected (i.e., the first node is the node immediately downstream of the decision node that is associated with an action that was performed earliest in time compared to the other nodes immediately downstream of the decision node). Next, the first branch of nodes, from the start node to the end node, is designated as the main branch. Then, for each unread node, the node is read from itself to the closest upstream node that has already been read. After all the nodes have been read, the number of nodes for each branch is determined. Each branch is identified by the number of nodes in the branch from longest to shortest. The identification of the branches from longest to shortest facilitates a sequence of how the branches are further used and/or processed.

In one embodiment, the video generated in step 604 of FIG. 6 uses screenshots from the process documentation guide as images in the generated video. The screenshots can be arranged in sequential order to represent the process flow. In one embodiment, a user can designate screenshots that should be associated with a process in order to prevent use of screenshots that pertain to incorrect actions taken by the user. Text of the screenshots can be converted to speech in order to provide audio to the images of the process.

Figure 7:
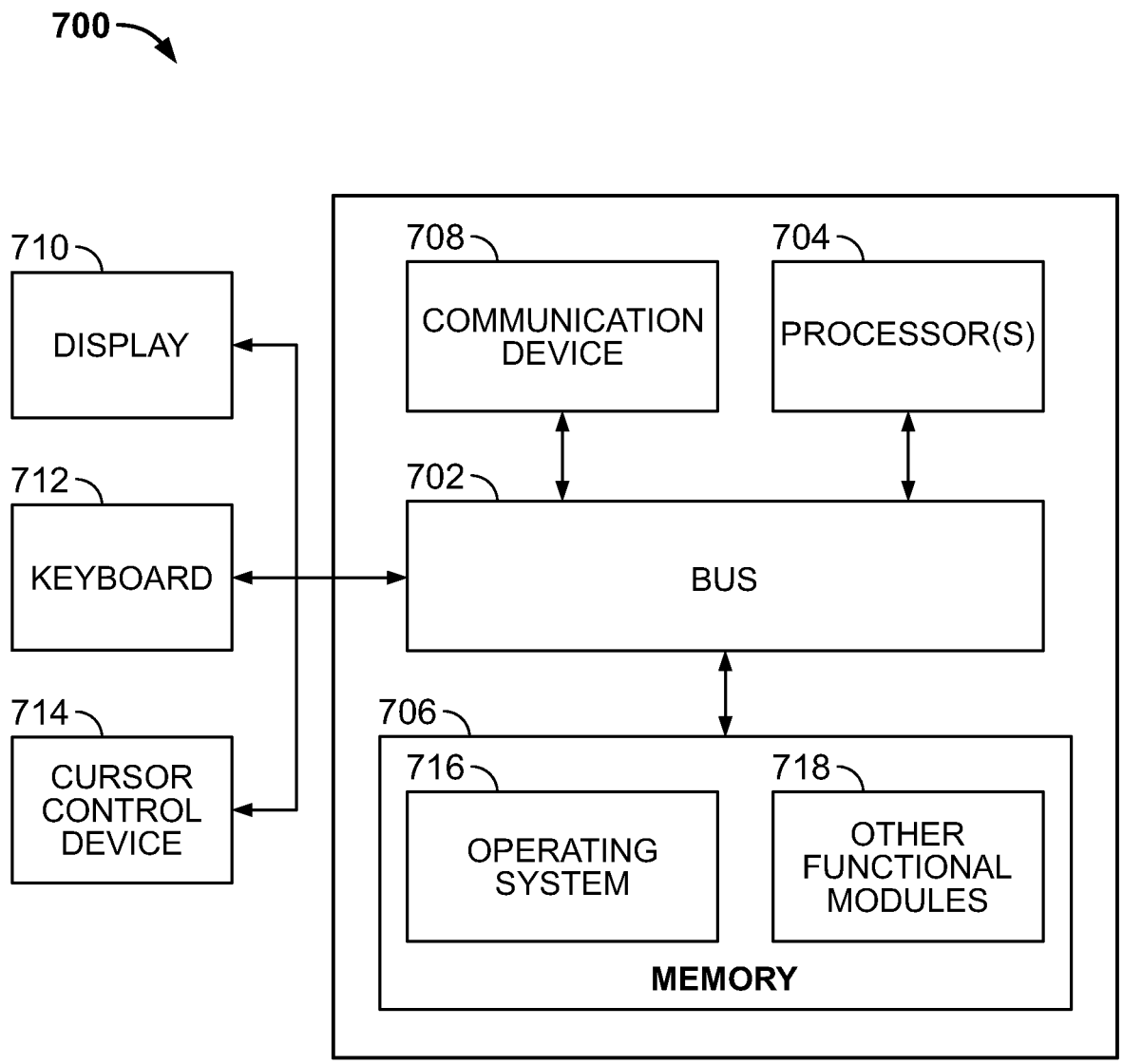
FIG. 7 shows a high-level block diagram of a computer for implementing a process video server according to an embodiment.

FIG. 7 is a block diagram illustrating a computing system 700 configured to execute the methods, workflows, and processes described herein, including FIG. 6, according to an embodiment of the present invention. In some embodiments, computing system 700 may be one or more of the computing systems depicted and/or described herein. Computing system 700 includes a bus 702 or other communication mechanism for communicating information, and processor(s) 704 coupled to bus 702 for processing information. Processor(s) 704 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 704 may also have multiple processing cores, and at least some of the cores may be configured to perform specific functions. Multi-parallel processing may be used in some embodiments.

Computing system 700 further includes a memory 706 for storing information and instructions to be executed by processor(s) 704. Memory 706 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 704 and may include volatile media, non-volatile media, or both. The media may also be removable, non-removable, or both.

Additionally, computing system 700 includes a communication device 708, such as a transceiver, to provide access to a communications network via a wireless and/or wired connection according to any currently existing or future-implemented communications standard and/or protocol.

Processor(s) 704 are further coupled via bus 702 to a display 710 that is suitable for displaying information to a user. Display 710 may also be configured as a touch display and/or any suitable haptic I/O device.

A keyboard 712 and a cursor control device 714, such as a computer mouse, a touchpad, etc., are further coupled to bus 702 to enable a user to interface with computing system. However, in certain embodiments, a physical keyboard and mouse may not be present, and the user may interact with the device solely through display 710 and/or a touchpad (not shown). Any type and combination of input devices may be used as a matter of design choice. In certain embodiments, no physical input device and/or display is present. For instance, the user may interact with computing system 700 remotely via another computing system in communication therewith, or computing system 700 may operate autonomously.

Memory 706 stores software modules that provide functionality when executed by processor(s) 704. The modules include an operating system 716 for computing system 700 and one or more additional functional modules 718 configured to perform all or part of the processes described herein or derivatives thereof.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like. A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention. Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The foregoing merely illustrates the principles of the disclosure. It will thus be appreciated that those skilled in the art will be able to devise various arrangements that, although not explicitly described or shown herein, embody the principles of the disclosure and are included within its spirit and scope. Furthermore, all examples and conditional language recited herein are principally intended to be only for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future.

The invention claimed is:

1. A method for generating a video using a process diagram and using a process documentation guide storing screenshots and user inputs, the method comprising:
    associating each node of the process diagram with a respective screenshot stored in the process documentation guide;
    associating each user action identified in the process documentation guide with a node of the process diagram;
    generating a video displaying each respective screenshot associated with each node of the process diagram in a sequence identified by the process diagram,
    wherein the associating each user action identified in the process documentation guide with a node of the process diagram comprises:
        reading the process diagram from start to end;
        marking each node of the process diagram as read by:
            selecting a first node downstream of a decision node, wherein the first node is associated with information having a timestamp earlier than other nodes downstream of the decision node;
            designating the first branch read as the main branch;
            for each unread node, read the unread node from itself to the closest upstream node that has already been read;
            determining the number of nodes for each branch; and
            identifying each branch based on the number of nodes in each branch.

2. The method of claim 1, further comprising:
    generating the process diagram based on information in the process documentation guide.

3. The method of claim 2, wherein the process documentation guide comprises a record of user inputs and screenshots associated with a user performing a process described in the process diagram.

4. The method of claim 2, wherein the process diagram is generated by a user and stored in a process video server.

5. The method of claim 2, wherein the process diagram is generated by a process video server and stored in the process video server.

6. The method of claim 1, wherein the reading the process diagram from start to end comprises analyzing each node of the process diagram.

7. A non-transitory computer readable medium storing computer program instructions for generating a video using a process diagram and using a process documentation guide storing screenshots and user inputs, which, when executed on a processor, cause the processor to perform operations comprising:
    associating each node of the process diagram with a respective screenshot stored in the process documentation guide;
    associating each user action identified in the process documentation guide with a node of the process diagram;
    generating a video displaying each respective screenshot associated with each node of the process diagram in a sequence identified by the process diagram,
    wherein the associating each user action identified in the process documentation guide with a node of the process diagram comprises:
        reading the process diagram from start to end;
        marking each node of the process diagram as read by:
            selecting a first node downstream of a decision node, wherein the first node is associated with information having a timestamp earlier than other nodes downstream of the decision node;
            designating the first branch read as the main branch;
            for each unread node, read the unread node from itself to the closest upstream node that has already been read;
            determining the number of nodes for each branch; and
            identifying each branch based on the number of nodes in each branch.

8. The non-transitory computer readable medium of claim 7, the operations further comprising:

generating the process diagram based on information in the process documentation guide.

9. The non-transitory computer readable medium of claim 8, wherein the process documentation guide comprises a record of user inputs and screenshots associated with a user performing a process described in the process diagram.

10. The non-transitory computer readable medium of claim 8, wherein the process diagram is generated by a user and stored in a memory in communication with the processor.

11. The non-transitory computer readable medium of claim 8, wherein the process diagram is generated by the processor and stored in a memory in communication with the processor.

* * * * *